United States Patent [19]

Sohngen

[11] 3,908,984
[45] Sept. 30, 1975

[54] FILM SEPARATOR

[75] Inventor: Edwin L. Sohngen, Cincinnati, Ohio

[73] Assignee: Sybron Corporation, Rochester, N.Y.

[22] Filed: July 23, 1973

[21] Appl. No.: 382,048

[52] U.S. Cl. .............. 271/113; 214/8.5 H; 221/261; 250/468; 271/22
[51] Int. Cl. ............................................... B65h 3/28
[58] Field of Search ............ 271/113, 101, 179, 21, 271/22, 23; 214/8.5 H; 221/261, 262; 250/468

[56] References Cited
UNITED STATES PATENTS

| | | | |
|---|---|---|---|
| 2,747,473 | 5/1956 | Monroe et al. | 271/113 X |
| 3,553,453 | 1/1971 | Hogan | 250/468 |
| 3,572,691 | 3/1971 | Heinricy | 271/23 |
| 3,768,804 | 10/1973 | Swanson | 271/101 |

*Primary Examiner*—Evon C. Blunk
*Assistant Examiner*—Bruce H. Stoner, Jr.
*Attorney, Agent, or Firm*—Theodore B. Roessel; James A. Rich

[57] ABSTRACT

Sheets such as cut X-ray films are separated from a stack by a disc positioned with its front face parallel to the top sheet of the stack and with the axis of the disc generally perpendicular to but not intersecting the top sheet. A slot extends diagonally through the edge of the disc, and an edge projects approximately the thickness of one sheet from the front face next to the slot. As the disc rotates the top sheet is picked up by the projecting edge and fed laterally through the slot to the rear face of the disc. A roller is pressed against the rear face, and after the separated sheet reaches the rear face it is gripped between the roller and the disc and moved forward or advanced so that it can be picked up by a film transport system.

14 Claims, 7 Drawing Figures

FILM SEPARATOR

BACKGROUND OF THE INVENTION

This invention relates to material handling, and more particularly to apparatus for separating sheets from a stack.

Sheet material is frequently provided in stacks, or bulk packs, and fed one sheet at a time through a processing system. For example, in certain radiographic systems, such as the one shown in U.S. Pat. No. 3,553,453 to William J. Hogan, cut sheets of X-ray film are stored in a supply magazine and fed a sheet at a time to an exposure station and on to a receiver magazine.

In some systems of this sort, sheets have to be pre-separated by hand and interleaved with plastic spacers so that sheet cohesion, static charges or the like will not prevent separation of the sheets. Needless to say, this adds a significant amount to the cost of using these systems.

SUMMARY OF THE INVENTION

It is an object of this invention to provide apparatus for separating sheet material, such as X-ray film, from a stack.

Another object is to provide sheet separation apparatus that eliminates the need for spacers between the sheets.

According to the invention a disc is positioned with its front face parallel to the top sheet of the stack and with the axis of the disc generally perpendicular to but not intersecting the top sheet. The stack is pressed against the disc. A slot extends diagonally through the edge of the disc from the front face, and an edge projects approximately the thickness of one sheet from the front face next to the slot. As the disc rotates, the top sheet is picked up by the projecting edge and fed laterally through the disc.

Since the disc pulls the top sheet laterally away from the rest of the stack, sheet cohesion, static charges and the like are less likely to interfere with separation of the sheets. Consequently, the sheets do not have to be pre-separated and interleaved with spacers.

Another object of the invention is to provide apparatus for advancing the separated sheet so that it can be picked up by a transport system. According to the invention, the above mentioned slot extends through the disc to its rear face, and a roller is pressed against the rear face. When the separated sheet reaches the rear face it is pinched between this face and the roller and moved forward or advanced to the transport system.

Other objects and advantages of this invention will be apparent from the following description.

DRAWINGS

Figure 3:
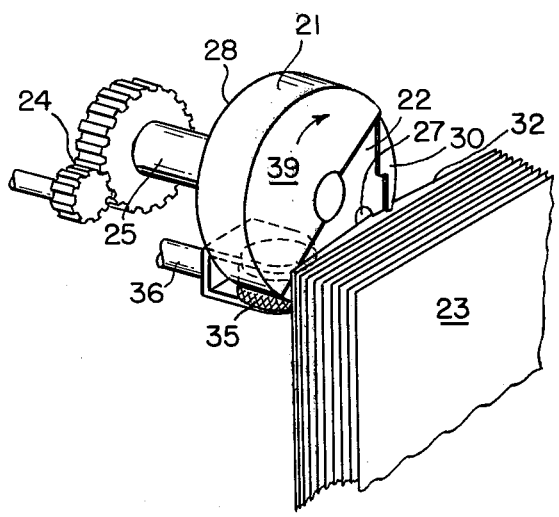
Figure 4:
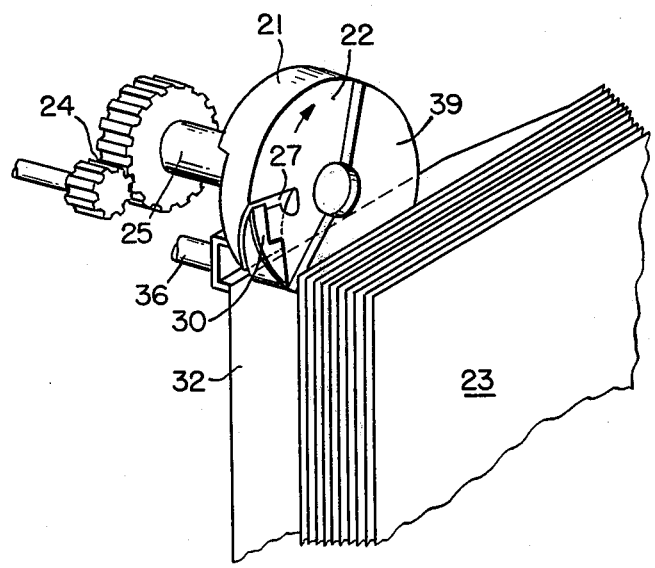

FIGS. 3 and 4 are perspective views of the pick-up disc that separates the film from the stack. FIG. 3 illustrates the disc at the point where the projecting edge is just picking up the top sheet of film from the stack. FIG. 4 shows the disc in the position where the top sheet has been fed laterally through the disc to the rear face and is being advanced between the rear face and roller.

Figure 5:
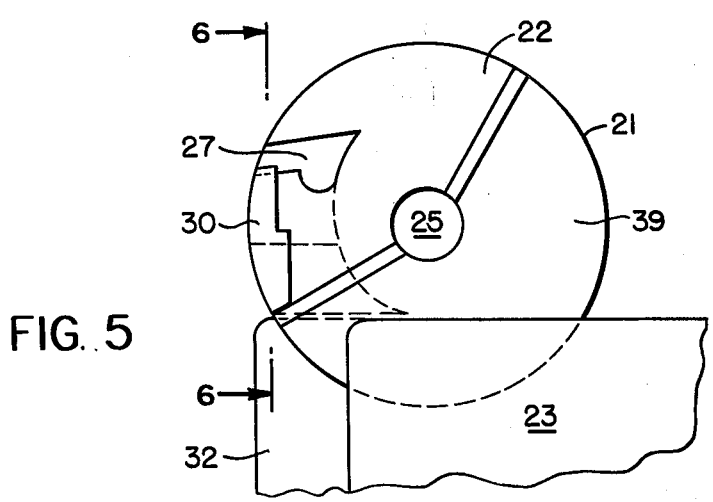

FIG. 5 is a front view of the disc.

Figure 7:
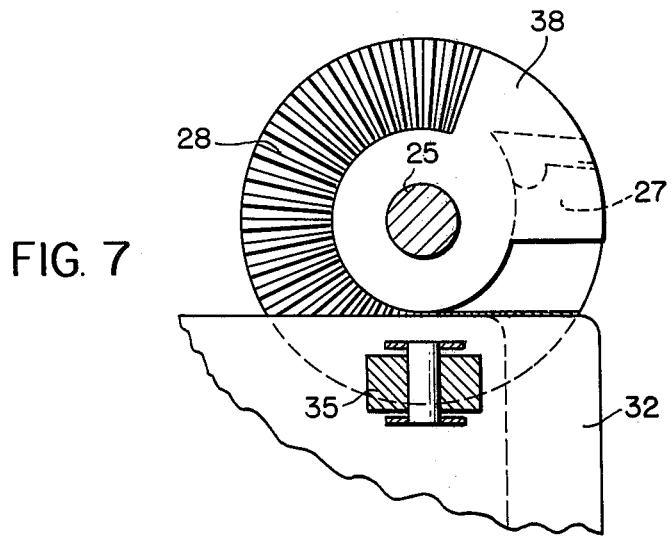
Figure 6:
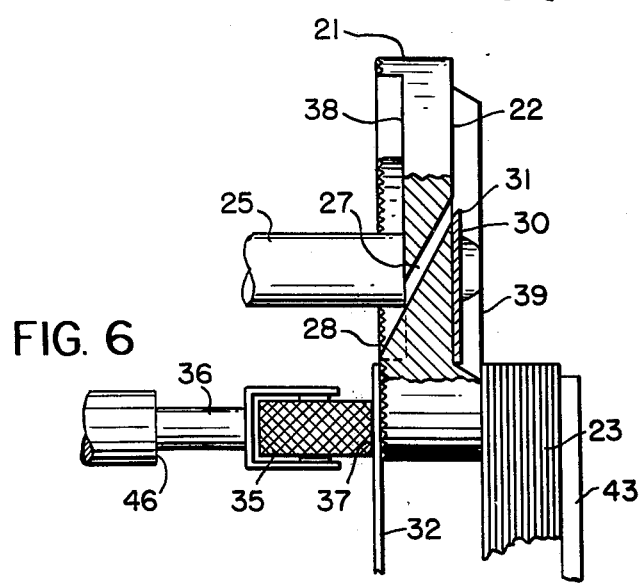

FIG. 6 is a cross-sectional view of the disc along lines 6—6 of FIGS. 5 and 7.

FIG. 7 is a rear view of the disc.

DETAILED DESCRIPTION

Figure 1:
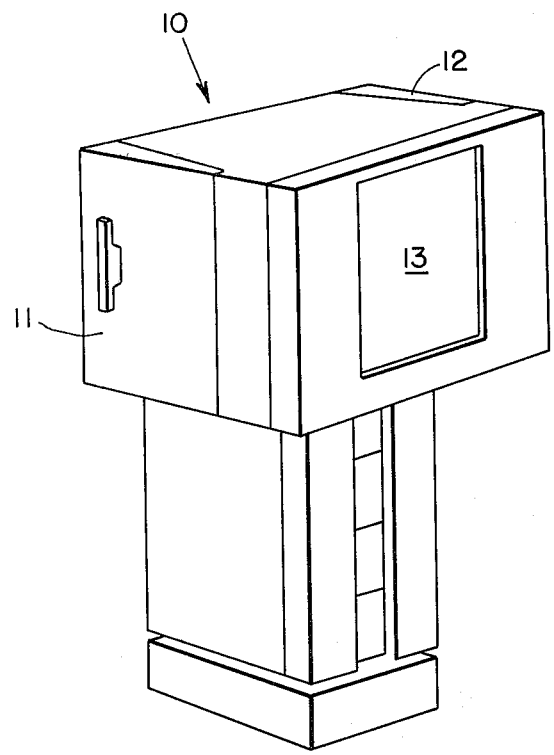
FIG. 1 is a perspective view of an X-ray system in which this invention may be utilized.

The automatic X-ray film loader 10 illustrated in FIG. 1 has a door 11 on one side for insertion of a supply magazine loaded with cut sheets of X-ray film, and a second door 12 on the other side for insertion of an empty receiver magazine in which the exposed film is stored. An X-ray transparent window 13 on the front of the loader 10 defines an exposure station where the patient is positioned.

Figure 2:
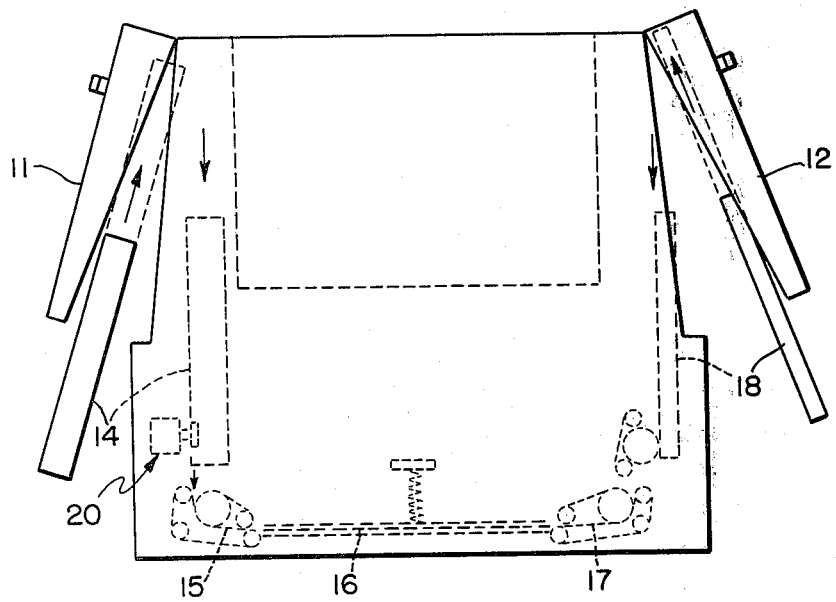
FIG. 2 is a plan view of the system in FIG. 1 illustrating the movement of film through the system.

Referring to FIG. 2, as the loading door 11 is closed and locked, a supply magazine 14 is automatically moved into position next to the pick-up or film separator assembly 20. At the same time, a door in the supply magazine is opened so that the sheets of film may be pulled from the magazine.

The pick-up assembly 20 separates and feeds the sheets of film one at a time to a belt transport system 15 that carries the sheets to the exposure station, where they are clamped between two intensifier plates 16. After the film is exposed, a second belt transport system 17 carries the film to a receiver magazine 18.

Referring to FIGS. 3–7, the pick-up assembly 20 includes a disc 21 positioned with its front face 22 parallel to the sheets 23 of film stacked in the supply magazine. A spring loaded plate 43, shown in FIG. 6, in the magazine presses the stack against the front face 22 of the disc. A motor (not shown) and a connecting gear train 24 rotate the disc 21 clockwise on its mounting shaft 25.

A slot 27, perhaps best seen in FIG. 6, extends diagonally through the edge or rim of the pick-up disc 21 from its front face 22 to its rear face 28. For ease of manufacture, a helical slot is preferred. However, other types of slots that extend diagonally through the edge of the disc in a manner similar to a helix may also be used.

As may be seen in FIGS. 5 and 7, the mounting shaft 25 is positioned far enough above the stack of sheets so that when the slot 27 is rotated to the bottom of the disc, the slot extends vertically at least as high as the top of the stack of sheets. Thus, as the slot moves from the position shown in FIG. 3 to the position shown in FIG. 4, the top sheet 32 of the stack of film can move through the disc from front to back.

A blade 30 is attached, e.g., by soldering, to the front face 22 of the pick-up disc next to slot 27. The edge 31 of blade 30 projects approximately the thickness of one of the sheets of film from the front face 22. Thus, as the disc rotates past the position shown in FIG. 3, the edge of the blade is forced between the top sheet 32 of film in the stack and the next sheet. The blade 30 guides the top sheet 32 into the slot 27, and as the disc continues to rotate towards the position shown in FIG. 4, the top sheet is fed laterally through the disc to its rear face 28. In effect, the disc is forced, like a spiral wedge, between the top sheet and the next one. The rest of the stack is held in place while the top sheet is pulled laterally away from the stack. As a result, sheet cohesion, static charges and the like are less likely to interfere with separation, and interleaving spacers are not needed.

Another feature that helps achieve positive separation is a raised step 39 that covers about two-thirds of the front face 22 of the pick-up disc. As the disc continues to rotate from the position shown in FIG. 4 back towards the position shown in FIG. 3, and the separated top sheet is advanced to the belt transport system 15 as described below, the raised step 39 pushes the rest of the stack of sheets 23 further into the supply magazine. This helps to keep sheet cohesion, static charges and the like from pulling additional sheets from the magazine as the top sheet 32 moves forward. When the disc returns to the position shown in FIG. 3, the raised step clears the stacked sheets 23, and they are forced back against the front face 22 so that the blade 30 can pick up the next sheet in the stack.

When the separated top sheet 32 of film has moved through slot 27 to the rear face 28 of the disc, it is gripped between the rear face 28 and an idler roller 35. The roller is mounted on a reciprocating shaft 36 and a spring (not shown) presses the rim 37 of the roller 35 against the rear face 28. The rim of the roller is roughened by knurling, serrations or the like to provide a better grip on the film; and as may be seen in FIG. 7, approximately three-quarters of the periphery of the rear face 28 is also roughened. As the pick-up disc 21 continues to rotate from the position shown in FIGS. 4–7 back towards the position shown in FIG. 3, the separated top sheet 32 is fed forward by the rear face 28 and the idler roller 35 into the belt transport system 15 shown in FIG. 2, which carries the sheet to the intensifier plates 16 at the exposure station.

Referring to FIGS. 6 and 7, there is a depressed step 38 on the rear face 28 of the pick-up disc. The depressed step, which covers about one-quarter of the periphery of the rear face, has a relatively smooth surface; whereas, as was mentioned above, the remainder of the periphery of the rear face is roughened to grip the film. Furthermore, the idler roller 35 and reciprocating shaft 36 are restricted in their lateral movement (by a projecting shoulder 46 in the shaft or the like) so that the separated top sheet 32 is not gripped between the roller and disc when the depressed step is aligned with the roller. Thus, when the step is aligned with the roller, the belt transport system 15 can pull the sheet from between the disc and roller without having to overcome the disc/roller driving force. When the depressed step reaches this position, the pick-up disc is stopped automatically and the belt transport takes over and carries the freed film to the exposure station.

As may be seen from the foregoing description, this invention provides a simple, compact and reliable means for separating sheets such as X-ray films from a stack and advancing the separated sheets to a transport system with a single revolution of the pick-up disc. Of course, various changes may be made in the embodiment described above. It should be understood that the foregoing description is merely illustrative and is not intended to limit the scope of this invention, which is defined by the following claims.

I claim:

1. Apparatus for separating sheets from a stack comprising:
    a disc positioned with a front face parallel to the top sheet of the stack and with the axis of the disc generally perpendicular to but not intersecting the top sheet;
    means for pressing the stack against said front face;
    a slot extending diagonally through the edge of the disc from the front face to a rear face of the disc;
    an edge projecting next to the slot approximately the thickness of one of said sheets from the front face, whereby as the disc rotates the top sheet is picked up by the projecting edge and fed laterally through the disc; and
    a roller having its rim pressed against said rear face, whereby when the top sheet reaches the rear face the sheet is gripped between the rear face and the roller and is advanced as the disc continues to rotate.

2. Apparatus according to claim 1 including a depressed step on said rear face and means for restricting the lateral movement of said roller, whereby the separated top sheet is not gripped between the rear face and the roller when the depressed step is aligned with the roller.

3. Apparatus according to claim 2 wherein the depressed step comprises about one quarter of the periphery of the rear face.

4. Apparatus according to claim 2 wherein the depressed step has a relatively smooth surface and the rest of the periphery of the rear face is roughened to grip the separated top sheet.

5. Apparatus according to claim 1, wherein the stack is held in a magazine having an opening that permits the top sheet in the stack to be withdrawn, further comprising a raised step on the front face of the disc, whereby as the top sheet is advanced by the rear face and the roller, the raised step pushes the rest of the stack further into the supply magazine to prevent accidental separation of additional sheets.

6. Apparatus according to claim 5 wherein the raised step comprises approximately two-thirds of said front face.

7. Apparatus according to claim 1 wherein the slot is helical.

8. In a radiographic film loader wherein sheets of cut film are fed one at a time from a stack of film in a supply magazine to an exposure station, improved means for separating a sheet of film from the stack and advancing the sheet into a transport system that moves the film to the exposure station, comprising:
    a disc positioned with a front face parallel to the top sheet in the stack and with the axis of the disc generally perpendicular to but not intersecting said top sheet;
    means for pressing the stack against said front face;
    a slot extending diagonally through the edge of the disc from the front face to a rear face;
    an edge projecting next to the slot approximately the thickness of one of said sheets from the front face, whereby as the disc rotates, the top sheet in the stack is picked up by said projecting edge and fed through the slot from the front face to the rear face; and
    a roller having its rim pressed against the rear face of the disc, whereby when the separated top sheet of film reaches the rear face it is gripped between the roller and the disc and advanced into the film transport system.

9. A film loader according to claim 8 including a depressed step on the rear face of the pick-up disc that permits the top sheet of film to slip from between the disc and the roller when it is picked up by the transport system.

10. A film loader according to claim 9 wherein the depressed step comprises about one-quarter of the periphery of the said rear face.

11. A film loader according to claim 9 wherein the depressed step has a relatively smooth surface and the rest of the periphery of said rear face is roughened to grip the film.

12. A film loader according to claim 8 including a raised step on the front face of the disc, whereby as the top sheet is advanced into the film transport system by the rear face and roller, said raised step pushes the rest of the stack of film further into the supply magazine to prevent accidental separation of additional sheets.

13. A film loader according to claim 12 wherein the raised step comprises about two-thirds of said front face.

14. A film loader according to claim 8 wherein the slot is helical.

* * * * *